US00H002139H

(19) United States

(12) Statutory Invention Registration

Moore

(10) Reg. No.: US H2139 H

(43) Published: Jan. 3, 2006

(54) ACTIVE HEATING SYSTEM FOR OIL PIPELINE

(75) Inventor: Alexander Fraser Moore, Windsor (GB)

(73) Assignee: Coflexip, Paris (FR)

(21) Appl. No.: 09/708,136

(22) Filed: Nov. 8, 2000

Related U.S. Application Data

(60) Provisional application No. 60/163,928, filed on Nov. 8, 1999.

(51) Int. Cl.
*F28D 7/10* (2006.01)

(52) U.S. Cl. ..... 165/154; 165/156

(58) Field of Classification Search ..... 165/154, 165/156

See application file for complete search history.

(56) References Cited

U.S. PATENT DOCUMENTS

| | | | | |
|---|---|---|---|---|
| 2,686,662 A | * | 8/1954 | Smith | 165/154 X |
| 3,777,502 A | * | 12/1973 | Michie, III et al. | 165/154 X |
| 3,951,175 A | * | 4/1976 | Eberhart | 165/156 X |
| 4,009,751 A | * | 3/1977 | Zelnik | 165/156 X |
| 4,697,636 A | * | 10/1987 | Mellsjo | 165/156 |

FOREIGN PATENT DOCUMENTS

| | | | |
|---|---|---|---|
| JP | 63-118592 | * | 5/1988 |
| JP | 3-207994 | * | 9/1991 |

* cited by examiner

*Primary Examiner*—Peter M. Poon
*Assistant Examiner*—M. Thomson
(74) *Attorney, Agent, or Firm*—Ostrolenk, Faber, Gerb & Soffen

(57) ABSTRACT

A pipeline for transmitting oil or other substance which forms a solid residue such as wax when the substance is cooled, as in a subsea oil pipeline. Pass a tube through the interior of the pipeline, e.g., at the wall of the pipeline. Transmit heated liquid or water through the tube for heating the material being passed through the pipeline to a temperature which avoids or eliminates the solid residue and for heating the pipeline.

9 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

ACTIVE HEATING SYSTEM FOR OIL PIPELINE

Applicant claims the benefit of United States provisional application No. 60/163,928, filed Nov. 8, 1999.

BACKGROUND OF THE INVENTION

The present invention relates to an oil pipeline which is exposed to cold operating conditions, particular to a subsea pipeline which is subject to cold water temperature and also to a subsea pipeline exposed to elevated subsea pressure.

Insulated oil pipeline is used in subsea transport of oil and in extraction of oil. In an oil field, when production initially starts and after production has halted for an interval, insulated subsea pipeline is at the cold water temperature. The reduced temperature of effluent in the pipe, such as residual oil and wax, will likely be reduced below the temperature of wax formation in the pipeline, which will lead to pipeline blockage, for example, between a subsea well and the receiving facility, such as a floating facility.

There are several known solutions to the problem of a chilled pipeline.

In subsea pipeline and riser systems, there is a requirement to keep the pipeline hot during normal operations and also during transient conditions, such as start up and cool down. This has traditionally been achieved by use of a passive insulation system around the pipe, typically using a low density material, such as polyurethane foam or a substance known under the trademark Rockwool. Passive insulation systems are limited in two main respects. The amount of insulation that can be applied to a pipeline has a practical limit because the effect of the applied material in reducing heat loss has a log normal distribution, providing diminishing return from simply adding more material. Secondly, passive insulation of a pipeline cannot assist during start up or restarting when the pipe is cool. The insulation can only keep the pipeline warm and it cannot input heat to a cold pipeline. For example, it is known that most pipeline blockages due to the presence of hydrates occur after an extended shut down.

One usual solution to the blockages is to introduce chemicals in the pipeline during start up. To avoid wax formation during start up, operators inject methanol or glycol in the effluent to reduce its viscosity.

Another possible solution is to heat the pipe before start up using an active heating system. This is particularly useful either for very long tie backs or for onerous thermodynamic conditions, particular experienced in riser systems. One type of active heating system uses electrical heating of the pipe, with obvious attendant expense. In another, more typically used system, the pipe has an annulus around it, and heating is achieved by transporting a heated fluid along the pipe annulus. More preferable in some current systems is the use of a small diameter tube(s) passing through the annulus around the oil carrying pipe, which is typically wound around the main pipe. The small tube(s) carries hot water which is pumped through it.

Both the electrical power heating system and the heated fluid transport down the annulus are technically feasible, but require significant amounts of energy to be effective. Further, they are thermally inefficient since they try to heat the pipe from the outside in. Such inefficiencies limit the use of these systems, both commercially and technically.

Current active heating systems that use small hot water carrying tubes require that the tubes be designed to resist being crushed. Hoses made of carbon steel or super duplex are used. When the tubes are comprised of thermoplastic material, reinforcing elements are added to protect these hot water tubes. The reinforcing elements either resist the crushing or are able to transmit the crushing force to the main pipeline. For example, U.S. Pat. No. 6,102,077 and references therein cited discloses a flexible pipe with thermoplastic hot water hose wound around the main pipe. Filler is added between each winding of the hot water hose to transmit the crushing force of the subsea environment to the main flexible pipe. Where rigid subsea pipes are used, the thermoplastic material hot water hoses are protected by an outer steel pipe called the carrier pipe. Alternatively, the hot water can be injected through the annulus between the inner pipe and the carrier pipe, avoiding need for use of a hot water tube.

The above described conventional techniques for heating the pipe have the drawback that there are significant heat losses toward the exterior of the pipe, and the energy level required for heating the pipe is high. For example, for a start up with a system wherein hot water is passed through the annulus between the outer and inner pipes, it may take up to ten days to heat the pipe sufficiently for efficient transmission of oil.

SUMMARY OF THE INVENTION

The primary object of the present invention is to transmit oil or a comparable residue containing liquid through a pipeline that would usually be chilled, particularly a chilled subsea pipeline.

Another object of the invention is to enable such transmission through an initially chilled pipeline with minimalized expenditure of energy.

A further object is to provide such transmission by heating a pipeline efficiently and in a shorter priod of time than heretobefore.

According to the invention, a heating element in the form of at least one small diameter tube is inserted inside the main pipeline and is used to transfer hot water or other heated liquid form one end of the pipeline to the other. The tube is disposed in the pipe, rather than being disposed in the annulus between the outside carrier pipe and the inner pipe. The tube in the main pipe is exposed to the liquid contents in the pipe. All of the heat losses of the hot water tube heat both the pipe and its contents passing through the pipeline. This has the additional benefit that the normal contents carried through the pipeline and the main pipeline itself through which the tube passes insulate the hot tube so that all heat losses from the tube are useful for heating the contents of the pipeline and the pipeline itself, and there is minimal heat loss to the surrounding chilled subsea environment. This arrangement enables very long lengths of pipe to be maintained at a suitable temperature, and start up conditions in the pipeline can be maintained when the pipeline is not operating, especially as the pipeline had been heated. Further, the time to initiate a start up in the pipeline is significantly reduced.

A primary advantage of the proposed system is that is uses less energy to heat the pipeline and can also make use of the energy expended in heating the pipeline to extend over a greater distance along a pipeline than is true for traditional active heating systems. Compared to passive insulation systems, the invention can offer better performance, using less material and at lower cost. For example, this active heating system could cut the cost of heating the pipeline by avoiding the need for a surrounding carrier pipe (and the resulting annulus) and the need for expensive additional insulation for the heating system.

Hot water injected through the hot water tube in the pipeline heats the pipeline to reach the start up condition. Sufficient heating may take up to two days, which is a significant benefit in comparison with the ten days that is required to heat a pipe to its start up conditions with hot water either injected in and traveling along the annulus or with hot water in pipes that pass through the annulus.

During continuous operation of the pipeline after start up, and when the insulation of the pipe itself is sufficient to keep the effluent temperature above the wax formation temperature, it should no longer be necessary to inject hot water through the hot water tube or pipe passing through the main pipe. During continuous operation, that pipe can then be used alternatively as a service conduit for a number of services for the pipe, including riser gas lift, bulk dosing of chemicals and control functions. When the pipeline is shut down, the inner pipe can again be used as the active heating system.

If the thermal insulation and/or the temperature of the oil being piped is insufficient to avoid wax formation and the temperature of the effluent is too low to avoid that formation, both passive thermal insulation of the pipeline and an active heating system may be combined to keep the effluent temperature above the wax formation temperature.

There is a significant drawback in the system which results from the hot water tube being inside the main pipeline and typically sitting on the bottom of the flow line. That drawback related to pigging of the main pipeline carrying effluent which is used to clean the interior of the pipe to remove wax and hydrate deposits. Since the pipeline interior with a hot water tube on its interior is no longer completely round, traditional pigs cannot be used. Developments not herein disclosed are being created for the purpose of solving the problem of pigging.

The installation of a smaller diameter auxiliary pipe in the bore of a larger diameter pipe for the small diameter pipe to supply heating to the larger pipe, is disclosed in U.S. Pat. No. 2,924,245, although the system there illustrated suggests that the auxiliary pipe for hot fluid or steam might be centered in and rigidly connected to the main insulated pipe and the system is not concerned with oil pipeline.

Other objects and features of the present invention will be described below in conjunction with the accompanying drawings.

DESCRIPTION OF PRIOR ART

Figure 1:
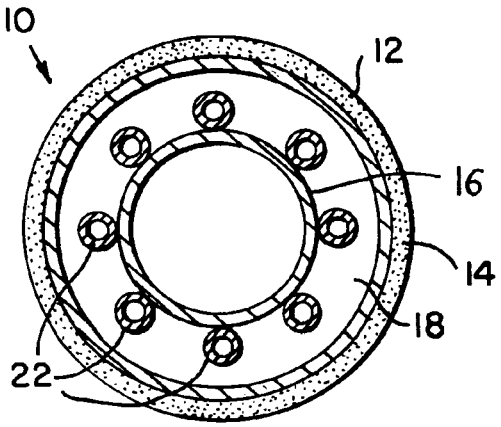
FIG. 1 PRIOR ART
FIG. 1 shows a cross section through a schematically illustrated first prior art embodiment of a heated pipeline.

In the prior art shown in FIG. 1, a conventional pipe 10 includes an outer carrier pipe 12 with a conventional heat insulation layer 14 around it. Disposed within the carrier pipe 12 and substantially uniformly spaced in from the interior of the carrier pipe there is an inner pipe 16 which carries the oil or other material to be transmitted by the pipeline. An annulus 18 is developed between the outer pipeline 12 and the inner pipeline 16. In order to heat the inner pipeline and particularly the contents thereof for the reasons discussed above, e.g., so as to prevent the formation of wax within the inner pipeline, there are a plurality of hot water hoses 22 that pass through the annulus 18. They give up their heat to the inner pipe to elevate the temperature of the inner pipe sufficiently to prevent wax formation. But they lose a considerable amount of the inner heat outward. In this case, it is possible for the annulus 18 to be filled with insulation material 14, to prevent heat loss from the hot water hoses 22 outwardly. Although several hot water hoses are illustrated in FIG. 1, an alternate hose design including a helical single hose or several interlaced helical hoses may be provided.

Figure 2:
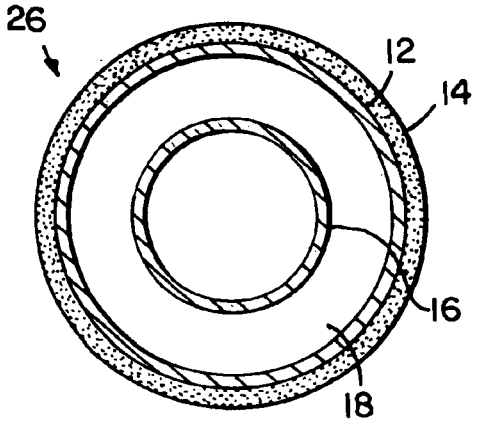
FIG. 2 PRIOR ART
FIG. 2 is a cross section schematically showing a second prior art embodiment of a heated pipeline.

The second prior art pipeline embodiment 26 of FIG. 2 is substantially similar to the embodiment of FIG. 1 and corresponding elements in FIG. 2 are correspondingly numbered. That pipeline 26 in FIG. 2 has the outer carrier pipe 12, the insulation layer 14 around the carrier pipe, the inner pipe 16 and the annulus 18 between the pipes. There are no hot water hoses for heating the inner pipe. Instead, hot water or other heating liquid is injected through and fills the annulus 18, or at least fills the annulus sufficiently to heat the inner pipe 16 sufficiently to prevent wax formation therein. The radii of the inner and outer pipes and the position of the inner pipe 16 within the outer pipe 12 are selected to permit the hot water injected through the annulus to effect sufficient heating. Even more than it experiences with the embodiment of FIG. 1, the pipeline 26 will experience heat losses outwardly from the carrier pipe 12, so that a good part of the heat from the annulus is wasted, rather than heating the liquid passing through the inner pipe.

In the above described prior art embodiments, the heating liquid and hot water hoses are in the annulus, are not inside the inner pipe and do not directly transmit heat from the heating supplying elements to the liquid passing through the inner pipe.

DESCRIPTION OF PREFERRED EMBODIMENTS

Figure 3:
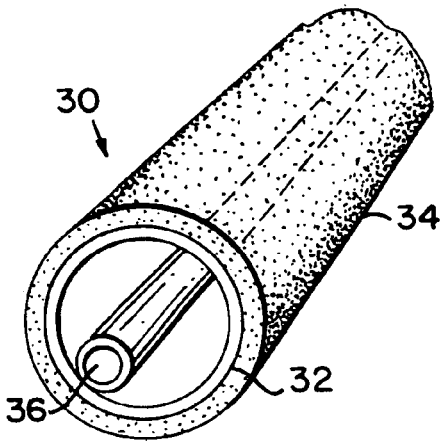
FIG. 3 schematically illustrates a perspective view of a pipeline embodiment according to the present invention.
Figure 4:
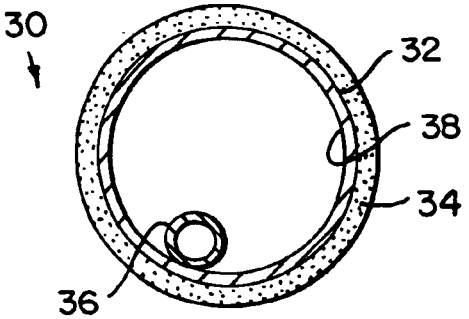
FIG. 4 is a cross section of the pipeline embodiment in FIG. 3.

Turning to the embodiment of the invention disclosed in FIGS. 3 and 4, the proposed pipeline 30 includes an outer main pipeline 32 which may be insulated, as at the layer 34, or may not be insulated, and may be buried beneath the subsea surface, which could insulate it against heat loss outward. The pipeline may be rigid or flexible, as is known.

Figure 5:
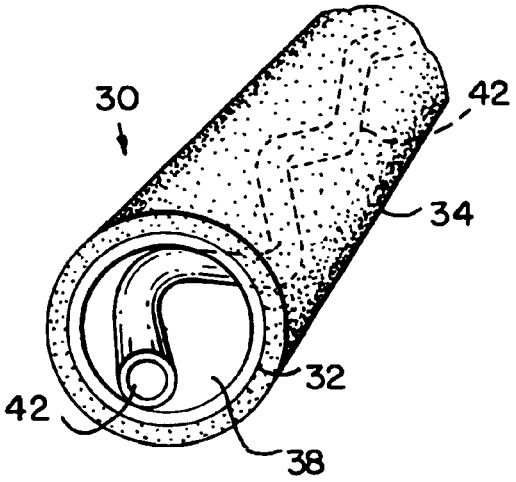
FIG. 5 schematically shows an alternate embodiment of the invention with the tube in the pipeline in an alternate configuration.

An elongate tube 36 passes through and along the main pipeline. It may be inserted during the pipeline fabrication process. The tube 36 may be inserted loosely in the pipe 32 and not be attached to the internal surface of the main pipeline. Alternatively, the tube may be affixed to the pipeline 32. It would be preferably attached at the ends of the pipeline. In interior surface 38, the tube may extend straight through the pipeline, or may have another shape therein, e.g., in a helix 42, as shown in FIG. 5. The helix may be normally sprung outward to rest on the pipeline interior surface or not, as selected.

In FIG. 3, the tube 34 passes essentially in a straight line or in a nonspecific configuration through the external pipeline 32. In FIG. 5, in contrast, the tube 42 is formed into a helix, either before installation of the tube into the pipe 32 or as the tube is being inserted into the pipe, and the helical tube 42 is so shaped or is slightly sprung to be so shaped as to contact the inner surface 38 of the pipeline 32. The helical pipe 42 provides more uniform distribution of heat around the pipe line 32, for a particular cross section of tube. It would also tend to provide more heat to the fluid material along the pipeline, because the tube is in a helix rather than extending in a straight line.

The materials of the tube 36, 42, the thickness of the walls of the tube, the diameter or cross section of the tube are selected for the desired heating purpose. The tube may be comprised of a plastic material, but is preferably of metal due to its heat conducting and radiating characteristics.

The tube can be installed either during fabrication of the main pipeline or can be installed in situ after the pipeline has been installed.

A fabrication technique that may be employed when the tube is installed during fabrication of the pipeline may comprise one of the following. The tube or inserted pipe can be installed in the main pipeline in the spool base, for the reeling method, and can be expanded using either pressure, or temperature, or both. The expanded inserted tube is then fixed to the main pipe at either end of the main pipeline stalk and is allowed to cool. Contraction of the pipeline induces a tensile load in the pipeline which is sufficient to ensure that the expansion of the tube during operation will not detrimentally affect the system performance. Ideally, the inserted tube will not move out of plane in any direction. This could be important for smooth passage of a pig system through the pipeline. The tension load induced in the pipe will have to be such that the pipe will not plastically deform during reeling or to ensure that any deformation is sufficiently recovered during subsequent straightening of the pipe. Alternatively, the fluid carrying heating tube can be simply inserted into the main pipeline without being fixed at all in place or being only fixed partially. The inserted tube will then be completely free or partially free to move in a different manner with respect to and inside the main pipe, particularly as the tube is heated by the hot liquid running through it and/or due to the pressure of the liquid which tends to straighten the pipe. In this case, the tube may be arranged to form or be applied in the form of a spiral or helix in the main pipe with a preset pitch for the spiral. Such a spiral arrangement will require a separate pigging system to be developed or require that the pipeline not have any pigging at all.

In a further variant of this, a spiral design for the fluid tube may be induced to a designated pitch. In this case, the tube would be pulled into the main pipeline and then be released. When it is released, the tube would spring against the wall of the main pipe. This system would have the advantage of keeping the tube on the pipe wall and not having it provide any difficulties during reeling or during operation with differential expansion or excessive strain.

For in situ installation, the tube is inserted into the main pipe either at the back of the pipe laying vessel, or from the host facility or subsea. Similar techniques to running a coil tubing could be employed.

As noted above, the main pipe which carries the fluids that are to be kept hot and/or the tube within that pipe may or may not be insulated and may or may not be buried in the subsea surface. The insulation and burial may or may not be constant over the length of the pipeline.

In addition to or as an alternative to the hot water tube carrying heating liquid, and especially when there is no need for the tube to carry the liquid, the tube may be used to carry various services, including electrical services that are used for servicing the pipeline installation or for heating purposes, for carrying chemical materials, such as methanol, hydraulic controls and various related or unrelated hydrocarbon materials.

The present invention may be used for gas lifts in risers and/or pipelines and could also be configured to offer direct entry to a well from a host facility via the tube.

Although the present invention has been described in relation to particular embodiments thereof, many other variations and modifications and other uses will become apparent to those skilled in the art. It is preferred, therefore, that the present invention be limited to not by the specific disclosure herein, but only by the appended claims.

What is claimed is:

1. An active heating system for a pipeline, comprising:

an elongate pipeline with an interior for carrying a substance to be heated;

a tube having a smaller cross section than the pipeline and passing through the interior of the pipeline for the tube to be in thermal communication with the substance in the pipeline so that heated substance passing through the tube will heat the pipeline and the material in the pipeline.

2. The system of claim 1, further comprising insulation on the pipeline.

3. The system of claim 1, wherein the pipeline has an interior wall defining the pipeline and the tube is disposed at the wall of the pipeline and extends along the wall of the pipeline.

4. The system of claim 1, wherein the tube is configured in the form of a helix that passes along the pipeline and is in contact with the interior of the pipeline extending along the pipeline.

5. The system of claim 1, wherein the tube is substantially unattached to the interior of the pipeline over substantially the entire length of the tube and the pipeline.

6. The system of claim 1, wherein the tube is configured in the form of a helix that passes along the pipeline.

7. The system of claim 6, wherein the helix of the tube is in contact with the interior of the pipeline extending along the pipeline.

8. A method of heating a liquid that is passing through a pipeline comprising:

passing a tube of smaller diameter through the pipeline of larger diameter;

passing the liquid through the pipeline;

passing a second heated liquid through the tube in the pipeline and permitting thermal transmission from the tube in the pipeline to the liquid passing through the pipeline for heating the liquid passing through the pipeline and for heating the pipeline.

9. The method of claim 8, further comprising forming the tube into a helix while passing the tube through the pipeline.

* * * * *